(12) United States Patent  (10) Patent No.: US 7,308,781 B2
Maconachy et al.  (45) Date of Patent: Dec. 18, 2007

(54) COMBINATION BULK AND TOTE LOADING HARVESTING APPARATUS AND METHOD

(75) Inventors: Frank J. Maconachy, Salinas, CA (US); David Offerdahl, Prunedale, CA (US); Jose Luis Garcia, Sr., Yuma, AZ (US)

(73) Assignee: Ramsay Highlander, Inc., Salinas, CA (US)

( * ) Notice: Subject to any disclaimer, the term of this patent is extended or adjusted under 35 U.S.C. 154(b) by 89 days.

(21) Appl. No.: 11/265,747

(22) Filed: Nov. 2, 2005

(65) Prior Publication Data

US 2007/0113531 A1 May 24, 2007

(51) Int. Cl.
 *B65B 67/00* (2006.01)
(52) U.S. Cl. .......................................... 53/391; 53/396
(58) Field of Classification Search .................. 53/390, 53/391, 392, 396; 198/312, 314, 615; 56/327.1, 56/212
 See application file for complete search history.

(56) References Cited

U.S. PATENT DOCUMENTS

| | | | | |
|---|---|---|---|---|
| 2,647,525 A | * | 8/1953 | Duda et al. ................... | 53/391 |
| 3,161,004 A | * | 12/1964 | Muzinich ...................... | 53/391 |
| 3,599,395 A | * | 8/1971 | Rodriguez et al. ............ | 53/391 |
| 3,724,168 A | * | 4/1973 | Cassady et al. ............... | 53/391 |
| 4,292,784 A | * | 10/1981 | Abatti et al. .................. | 53/391 |
| 4,355,433 A | * | 10/1982 | Dietrich ..................... | 56/328.1 |
| 4,590,739 A | * | 5/1986 | Abatti et al. .................. | 53/391 |
| 5,218,812 A | * | 6/1993 | Ventura et al. ............... | 53/391 |
| 6,996,964 B2 | * | 2/2006 | Maconachy et al. ....... | 56/327.1 |
| 6,997,194 B2 | * | 2/2006 | Maconachy ................ | 56/327.1 |

* cited by examiner

*Primary Examiner*—Louis Huynh
(74) *Attorney, Agent, or Firm*—Jeffrey Weiss; Weiss & Moy, P.C.

(57) ABSTRACT

A harvester capable of alternate configurations for bulk and tote loading. In a tote loading configuration, harvested produce is moved along a main conveyor, elevated to a raised conveyor area, packed into totes, and the packed totes are then moved onto a lower conveyor for further transport. In a bulk loading configuration, the harvested produce is transported along the main conveyor, to a raised conveyor area, and are then lifted using an elevator for placement into a bulk bin.

7 Claims, 5 Drawing Sheets

COMBINATION BULK AND TOTE LOADING HARVESTING APPARATUS AND METHOD

FIELD OF THE INVENTION

The present invention relates to harvesting apparatus and methods and, more particularly, to an apparatus and method that permits a harvester to be utilized, alternately, for bulk and tote loading of harvested produce.

BACKGROUND OF THE INVENTION

Mobile harvesting apparatuses, including of the self-propelled type, are well-known in the harvesting industry. Even for produce that is hand-cut from the ground, mobile harvesters may be utilized to facilitate the efficient washing and packing of harvested produce in a field setting.

There are several methods of packing harvested produce. For example, one method involves the bulk loading of harvested produce into large containers such as bins. Another involves the loading of produce into cartons, known in the industry as "totes." Depending on the preference of the harvester and/or customer, it may be desired to pack the same type of produce, e.g., lettuce, into either bins or totes.

Mobile harvesting apparatuses are relatively expensive pieces of farming equipment. In today's dollars, they can cost several hundred thousand dollars to purchase. It would therefore be preferable to provide a single harvester, which could be utilized, alternately, for either tote or bulk loading of harvested produce.

The present invention satisfies these needs, and provides other related advantages.

SUMMARY OF THE INVENTION

In accordance with one embodiment of the present invention, a combination bulk and tote loading harvester is disclosed. The harvester comprises, in combination: a first harvester end; a second harvester end opposite the first harvester end; a main conveyor adapted to transport harvested produce in a direction from the first harvester end to the second harvester end; a substantially horizontal raised conveyor area positioned at a level higher than the main conveyor and located proximate the second harvester end; means for elevating the harvested produce from the main conveyor to the raised conveyor area; a lower conveyor adapted to transport filled totes; a first elevator adapted to lift the filled totes from a terminus of the lower conveyor; a second elevator adapted to lift the harvested produce in an unpacked state from a terminus of the raised conveyor area toward a bin; and means for permitting the first elevator and the second elevator to be alternately coupled to the second harvester end.

In accordance with another embodiment of the present invention, a method for converting a harvester between bulk loading and tote loading is disclosed. The method comprises: utilizing a harvester comprising, in combination: a first harvester end; a second harvester end opposite the first harvester end; a main conveyor adapted to transport harvested produce in a direction from the first harvester end to the second harvester end; a substantially horizontal raised conveyor area positioned at a level higher than the main conveyor and located proximate the second harvester end; means for elevating the harvested produce from the main conveyor to the raised conveyor area; a lower conveyor adapted to transport filled totes; a first elevator adapted to lift the filled totes from a terminus of the lower conveyor; a second elevator adapted to lift the harvested produce in an unpacked state from a terminus of the raised conveyor area toward a bin; and means for permitting the first elevator and the second elevator to be alternately coupled to the second harvester end; coupling the first elevator to the terminus of the lower conveyor; transporting the filled totes on the first elevator; removing the first elevator; coupling the second elevator to the second harvester end; and lifting the harvested produce with the second elevator from the terminus of the raised conveyor area in the direction of the bin.

In accordance with another embodiment of the present invention, a harvesting method is disclosed. The method comprises: utilizing a harvester comprising, in combination: a first harvester end; a second harvester end opposite the first harvester end; a main conveyor adapted to transport harvested produce in a direction from the first harvester end to the second harvester end; a substantially horizontal raised conveyor area positioned at a level higher than the main conveyor and located proximate the second harvester end; means for elevating the harvested produce from the main conveyor to the raised conveyor area; a lower conveyor adapted to transport filled totes; an elevator adapted to lift the filled totes from a terminus of the lower conveyor; wherein the elevator is coupled to the second harvester end; at least one tiltable platform located at a level lower than that of the raised conveyor area and substantially at a level of the lower conveyor when coupled to the second harvester end; transporting the filled totes on the lower conveyor; positioning a filled tote on the tiltable platform; and tilting the tiltable platform sufficiently to cause the filled tote to move from the tiltable platform to the lower conveyor; and transporting the filled totes from the lower conveyor to the elevator.

DETAILED DESCRIPTION OF THE PREFERRED EMBODIMENTS

Figure 3:
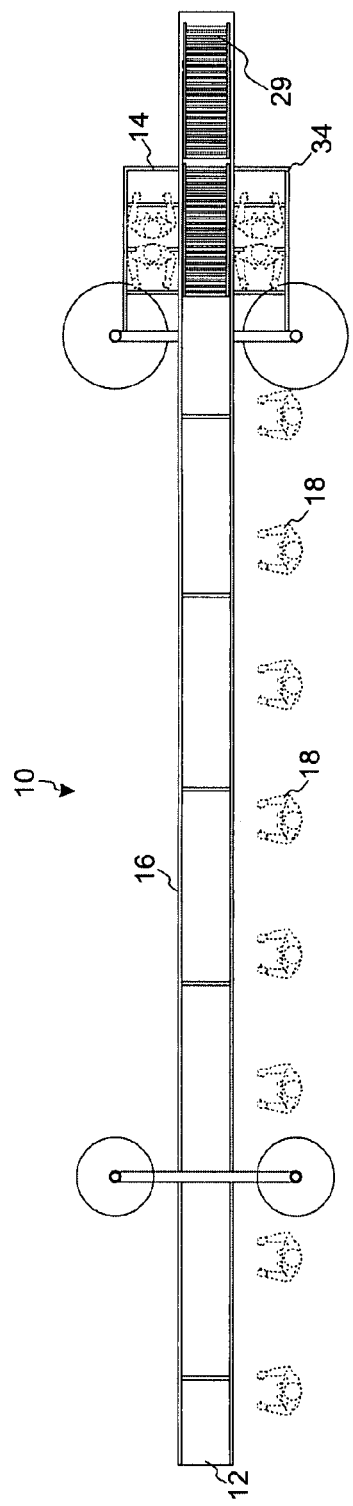
FIG. 3 is a top view of a harvesting apparatus consistent with an embodiment of the present invention, showing the main conveyor and pneumatic carton station.
Figure 5:
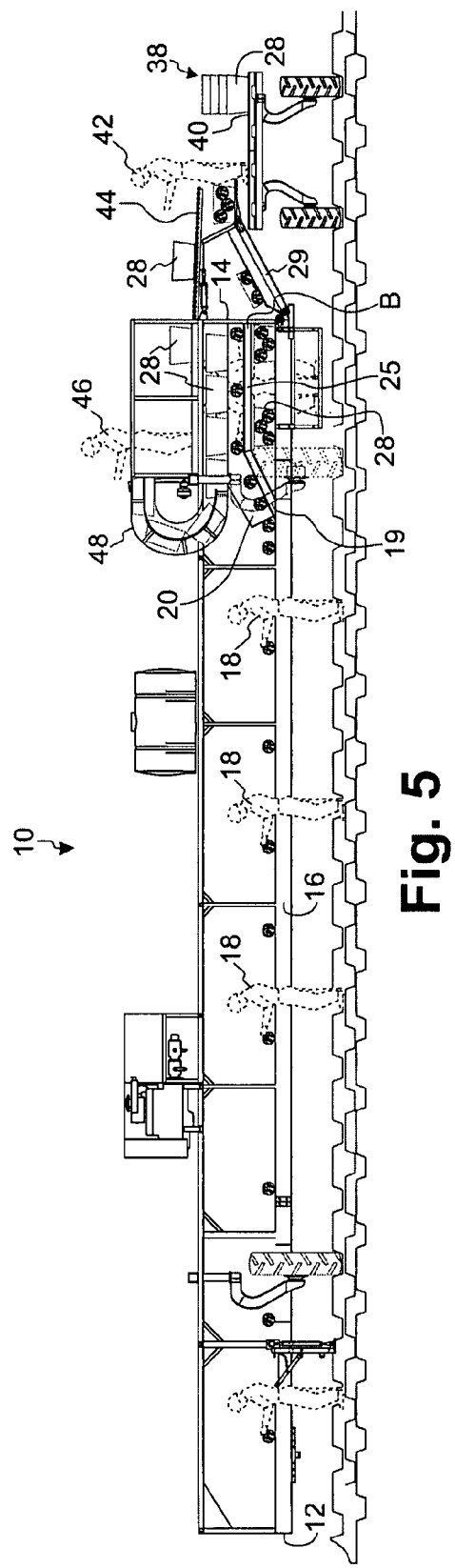
FIG. 5 is a side view of a harvesting apparatus consistent with an embodiment of the present invention, in a tote-loading configuration.
Figure 6:
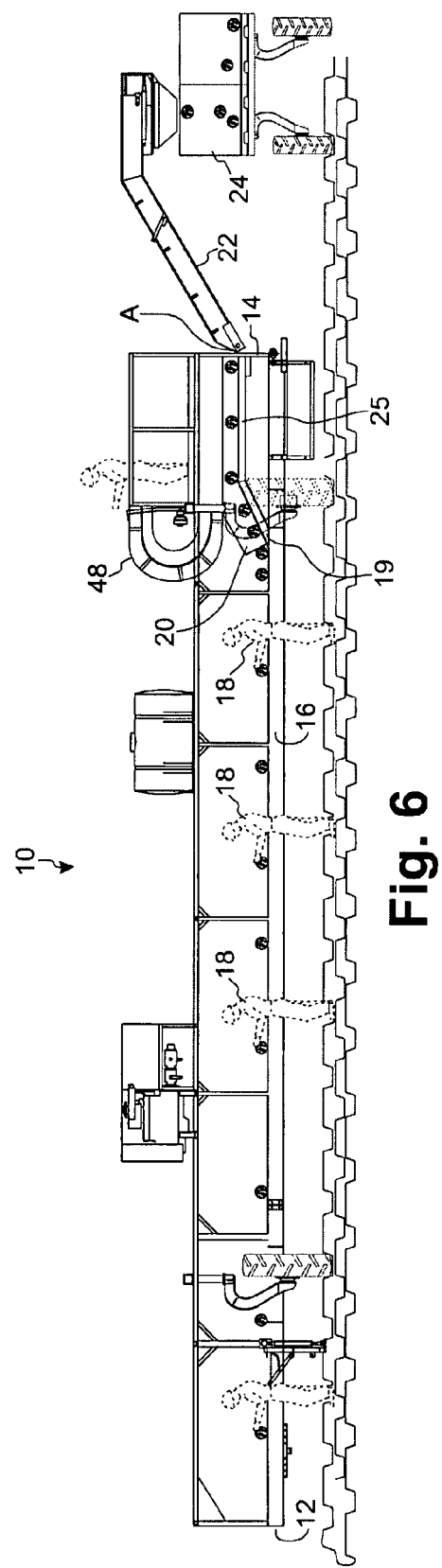
FIG. 6 is a side view of a harvesting apparatus consistent with an embodiment of the present invention, in a bulk loading configuration.

Referring first to FIGS. 3 and 5-6, the general topography of a harvester 10 consistent with an embodiment of the present invention is shown. In general, the harvester 10 can be described as having a first second originating at a first end 12, and terminating at a second end 14. Whether configured for tote or bulk loading as herein described, the configuration of the section of the harvester 10 between the first end 12 and the second end 14 may remain the same. The harvester 10 further comprises a second section, where actual loading of harvested produce occurs, which may alternately be configured for tote or bulk loading as herein described.

In this embodiment, the harvester 10 comprises a main conveyor 16, onto which workers 18 called "cutters" place harvested produce, such as heads of lettuce. The produce moves along the main conveyor 16 in the direction of the second end 14. It eventually reaches an incline 19, which also contains a washing station 20. It is washed as it ascends through the washing station 20. (It should be apparent that, without departing from the spirit or scope of the present invention, the washing station 20 could be eliminated, or could be modified in any of a variety of ways, including for example by having the main conveyor 16 continue therethrough without ascending.)

Figure 8:
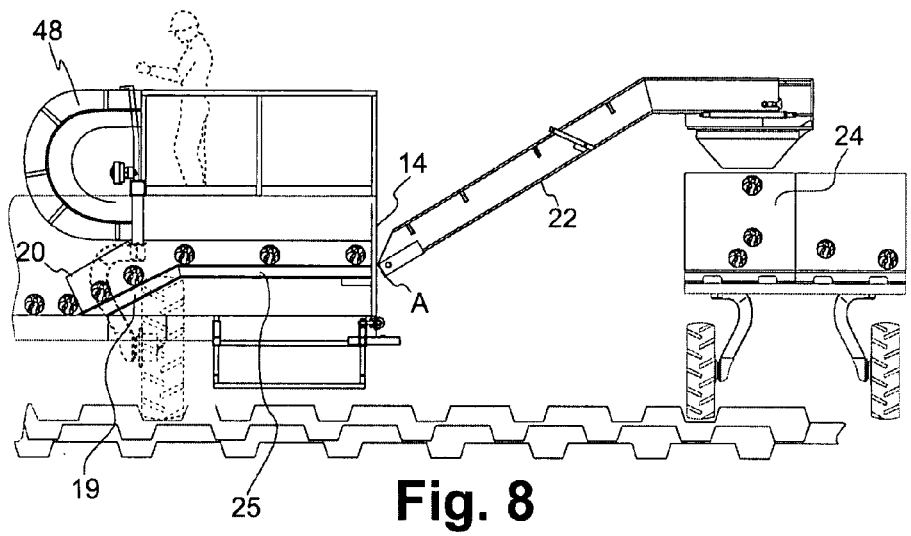
FIG. 8 is a side view of a harvesting apparatus consistent with an embodiment of the present invention in a bulk loading configuration, illustrating more particularly the off-loading of filled totes and the loading of empty totes.

Referring now to FIGS. 6 and 8, the bulk loading configuration of the harvester 10 is described. In this embodiment, an elevator 22 raises the harvested produce from the level of the main conveyor 16. The elevator may be continuous with the main conveyor 16 (or, more particularly, as described below, a raised area 25 that is continuous with the main conveyor 16.) For example, it may be desired to provide a main conveyor 16 comprised of a series of linked sections, so that it can be extended simply by removing links and inserting a new section—with the new section to comprise the elevator 22. In this configuration, the harvested produce proceeds through the washing station 20, up the elevator 22, and into a bulk bin 24 that is towed alongside the harvester 10.

Referring now to FIGS. 1-2, 5 and 7, the tote loading configuration of the harvester 10 is described. In this embodiment, after passing through washing station 20, the harvested produce reaches a raised area 25 (as compared to the level of the main conveyor 16) where a group of workers called "packers" are located (herein referred to as "packers 26"). Preferably, this raised area 25 is continuous with the main conveyor 16—i.e., utilizes the same belt as the main conveyor 16—though separate conveyors may be provided if desired. The packers 26 remove the produce lettuce heads from the raised area 25 and place them in totes 28.

Figure 1:
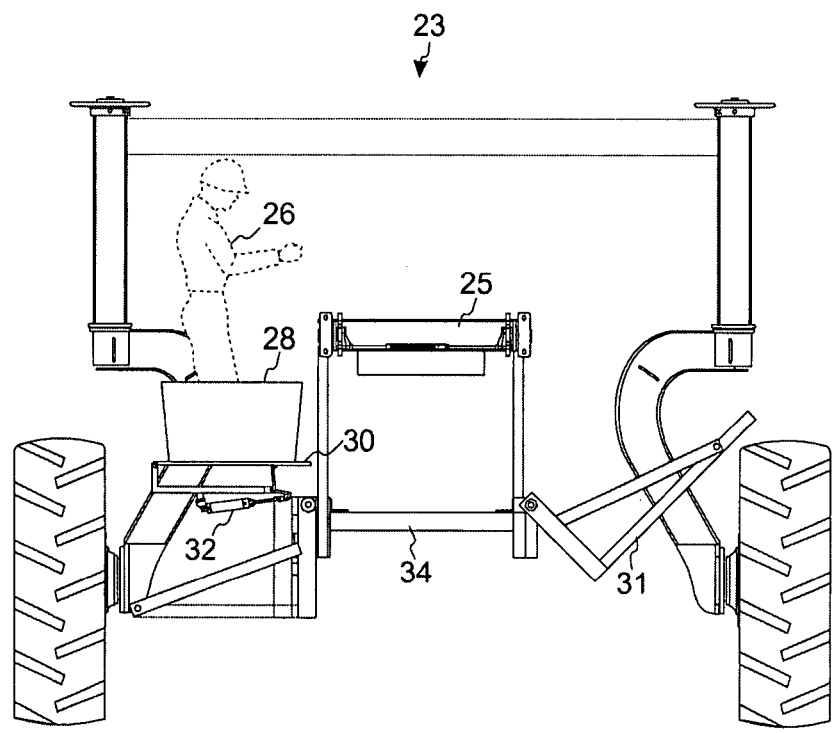
FIG. 1 is an end view of the pneumatic carton station portion of a harvesting apparatus consistent with an embodiment of the present invention.
Figure 2:
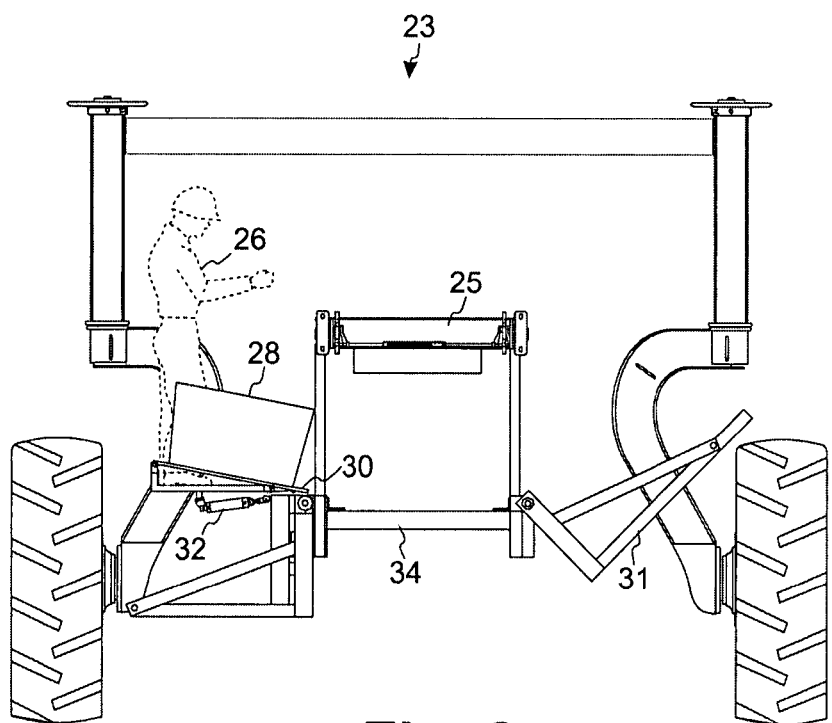
FIG. 2 is an end view of the pneumatic carton station portion of a harvesting apparatus consistent with an embodiment of the present invention, illustrating the raising of a filled tote.
Figure 7:
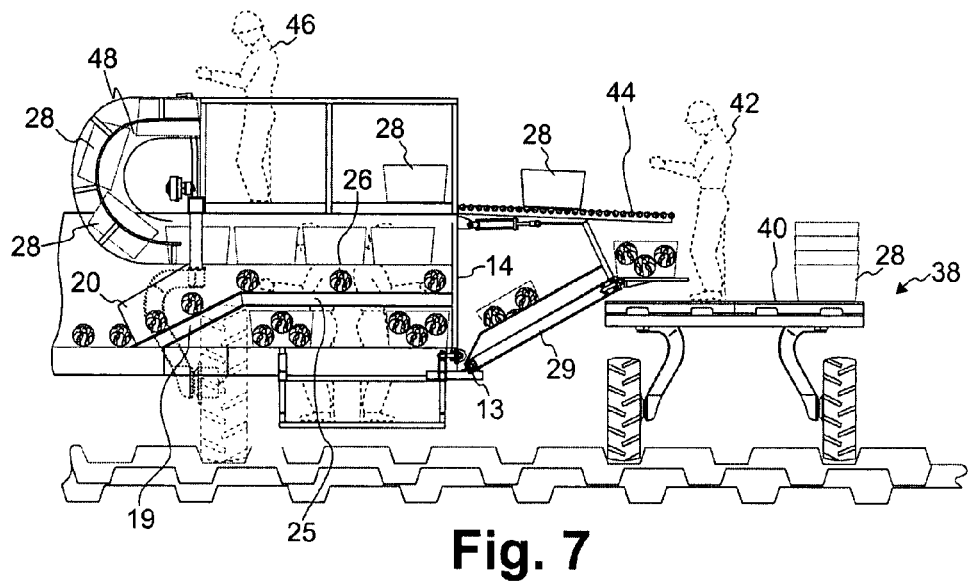
FIG. 7 is a side view of a harvesting apparatus consistent with an embodiment of the present invention in a tote loading configuration, illustrating more particularly the off-loading of filled totes and the loading of empty totes.

Referring specifically to FIGS. 1-2, prior to loading, the packer 26 places an empty tote 28 on a tiltable platform 30, which is located at a level that is lower than that of the raised area 25. The platform 30 may be titled forward by activation of a pneumatic piston 32, or the like. The platform 30 should be at the same level as a lower conveyor 34. The platform 30 preferably has rollers (not shown) or the like positioned thereon. (As shown in FIGS. 5 and 7, it may be desired to provide a plurality of platforms 30, so that a plurality of packers 26 may pack simultaneously.)

Figure 4:
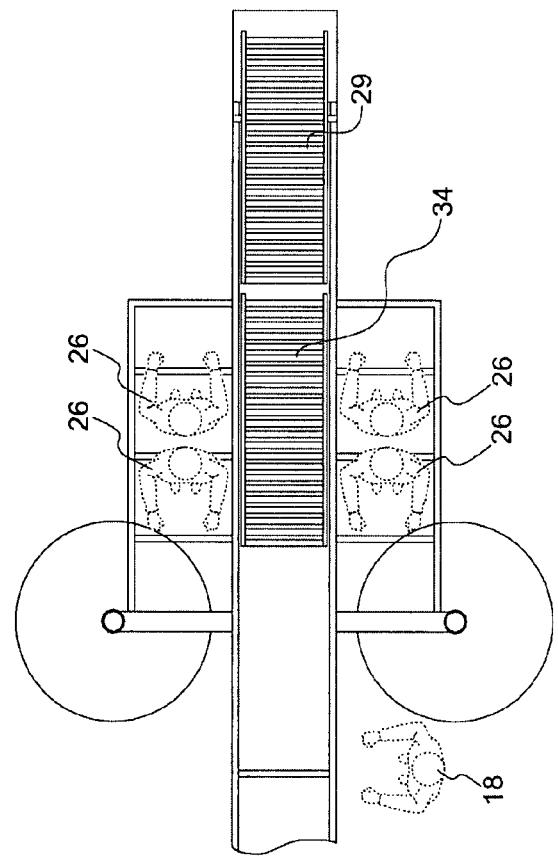
FIG. 4 is a top view of a harvesting apparatus consistent with an embodiment of the present invention, showing more particularly the pneumatic carton station.

When the tote 28 is filled, the packer 26 may activate the piston 32, lifting the rear edge of the platform 30 and thus causing the platform 30 to tilt forward. See FIG. 2. That permits the filled tote 28 to roll or slide forward onto the lower conveyor 34, which may be roller type. (See, e.g., FIGS. 3-4) The lower conveyor 34 then transports the filled totes 28 to an elevator 29 and from there onto a trailer 38 which travels alongside the harvester 10, where the filled totes 28 may be placed on pallets 40 by a loader 42. Referring to FIGS. 1-2, the portion of the harvester 10, herein described, where the packers 26 perform their roles of packing produce into totes 28 and tilting the platform 30 forward to place packed totes 28 onto the lower conveyor 34 is referred to generally as the packing station 23.

Attention is now drawn to the process by which the harvester 10 may be loaded with empty totes 28. As shown in FIGS. 5 and 7, the loader 42 may take empty totes 28 from the trailer 38, and place them on an empty tote roller conveyor 44, which is positioned above the raised area 25 so as not to interfere with the work of the packers 26 within the packing station 23. The empty totes 28 may be removed from the roller conveyor 44 by a driver 46, and placed top down on a J-shaped tote roller conveyor 48, which transports the empty totes 28 to the packing station 23. The packers 26 are then able to remove empty totes 28 from the J-shaped conveyor 48 and use them for packing purposes as above-described.

Attention is now directed to a manner of switching between the herein-described bulk and tote loading configurations. As shown by way of example in FIGS. 5-8, whether fitted for bulk or tote loading, the harvester 10, in these embodiments, transports produce along the main conveyor 16, though washing station 20, and to the raised area 25. When the harvester 10 is to be configured for bulk loading, the elevator 22 is attached at point A, proximate the exit point of the raised area 25. Preferably, as noted above, an extendible, link-type of conveyor material is utilized, so that the conveyor belt traveling along the main conveyor 16, raised area 25, and elevator 22 may be continuous.

In this configuration, the packing station 23 may be left as is or, alternatively, the platforms 30 may be removed and the support structure 31 located therebelow may be folded upward.

When it is desired to convert the harvester 10 for tote loading, the elevator 22 will be removed. If the platforms 30 have been removed, they will be reinstalled within the packing station 23. It will then be necessary to couple the elevator 29 at point B, proximate the terminus of the lower conveyor 34.

It should be noted that while alternative configuration of the harvester 10 for bulk and tote loading as herein described is preferred, it may be preferred to provide a harvester 10 having a fixed configuration for either bulk or for tote loading, utilizing features as herein described.

We claim:

1. A method for converting a harvester between bulk loading and tote loading configurations, comprising:
utilizing a harvester comprising, in combination:
a first harvester end;
a second harvester end opposite the first harvester end;
a main conveyor adapted to transport harvested produce in a direction from the first harvester end to the second harvester end;
a substantially horizontal raised conveyor area positioned at a level higher than the main conveyor and located proximate the second harvester end;
means for elevating the harvested produce from the main conveyor to the raised conveyor area;
a lower conveyor adapted to transport filled totes;
a first elevator adapted to lift the filled totes from a terminus of the lower conveyor;

a second elevator adapted to lift the harvested produce in an unpacked state from a terminus of the raised conveyor area toward a bin; and means for permitting the first elevator and the second elevator to be alternately coupled to the second harvester end;

coupling the first elevator to the terminus of the lower conveyor;

transporting the filled totes on the first elevator;

removing the first elevator;

coupling the second elevator to the second harvester end; and lifting the harvested produce with the second elevator from the terminus of the raised conveyor area in the direction of the bin.

2. The method of claim 1 wherein the harvester further comprises a washing station located along the main conveyor between he first harvester end and the second harvester end and further comprising the step of washing the harvested produce in the washing station.

3. The method of claim 1, further comprising at least one tiltable platform located at a level lower than that of the raised conveyor area and substantially at a level of the lower conveyor when coupled to the second harvester end and further comprising the steps of:

positioning a filled tote on the tiltable platform; and tilting the tiltable platform sufficiently to cause the filled tote to move from the tiltable platform to the lower conveyor.

4. The method of claim 1 wherein the main conveyor comprises a link-type belt and wherein the step of coupling the second elevator to the second harvester end includes the step of forming a continuous belt traveling along both of the main conveyor and the second elevator.

5. The method of claim 1 wherein the harvester further comprises a J-shaped conveyor adapted to transport empty totes to a packer located proximate the raised conveyor area and further comprising the step of placing the empty totes in the J-shaped conveyor.

6. The method of claim 5 wherein the step of placing the empty totes comprises the step of placing them in a top-down orientation.

7. The method of claim 1 wherein the harvester further comprises an empty tote conveyor coupled proximate the second harvester end and extending rearward of the harvester, and positioned at a level higher than that of the raised conveyor area and further comprising the step of loading empty totes on the empty tote conveyor.

* * * * *